United States Patent

Grove

[15] 3,636,771
[45] Jan. 25, 1972

[54] MULTIFREQUENCY SAMPLING SYSTEM AND METHOD

[72] Inventor: Byron F. Grove, 200 Mount Ave., Missoula, Mont. 59801

[22] Filed: Dec. 11, 1969

[21] Appl. No.: 884,163

[52] U.S. Cl. .........................................................73/421 R
[51] Int. Cl. ..........................................................G01n 1/00
[58] Field of Search..........................73/421 R, 421 A, 421 B; 273/139; 283/6; 40/121

[56] References Cited

UNITED STATES PATENTS

| | | | |
|---|---|---|---|
| 492,772 | 3/1893 | Ames | 40/121 X |
| 633,459 | 9/1899 | Jordan | 402/70 |
| 2,095,111 | 10/1937 | Triolo | 273/139 |
| 2,109,603 | 3/1938 | Work | 273/139 |
| 2,874,977 | 2/1959 | Morris | 283/6 |
| 3,522,735 | 8/1970 | O'Brien | 73/421 |

Primary Examiner—Louis R. Prince
Assistant Examiner—Daniel M. Yasich
Attorney—Graybeal, Cole & Barnard

[57] ABSTRACT

Multifrequency sampling system utilizing an underlay card with an arrangement of sampling numbers on its face which are identified by a code designation. An overlay or face card covering the sampling numbers is provided with tabs which can be removed or lifted to reveal a number on the underlay card. On the face card is a frequency table correlated to the sampling numbers. A frequency selected from the frequency table indicates which numbers on the underlay card will designate a sample to be taken.

13 Claims, 9 Drawing Figures

INVENTOR.
BYRON F. GROVE

ATTORNEYS

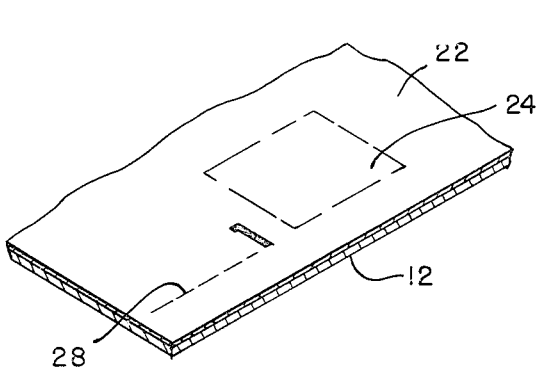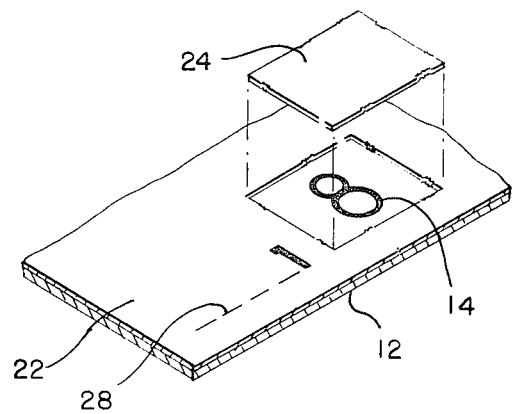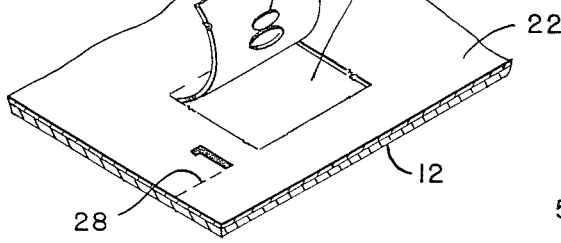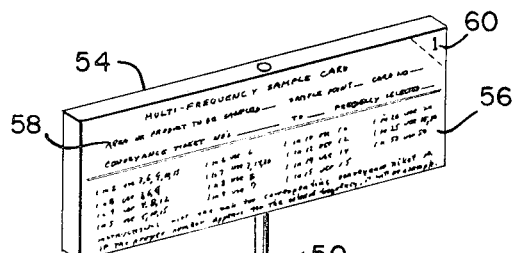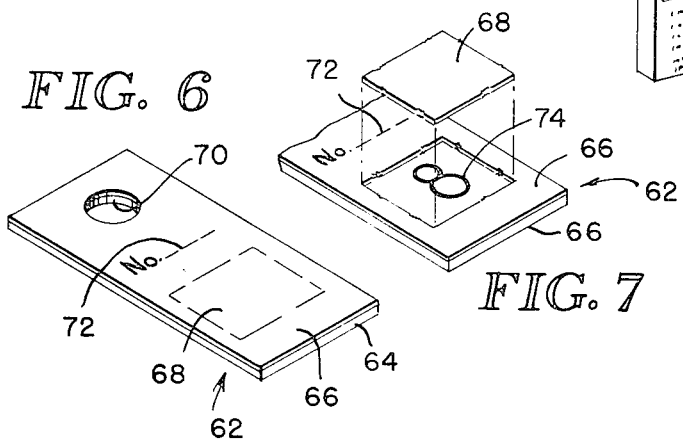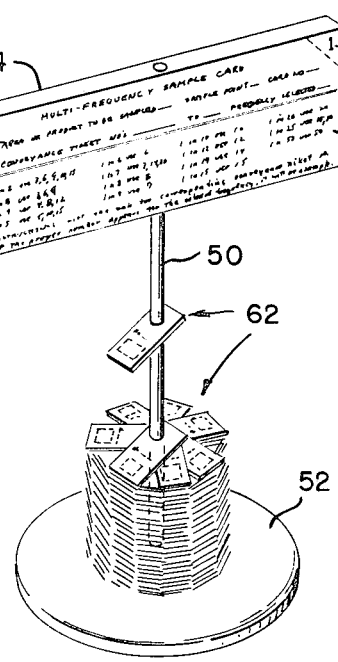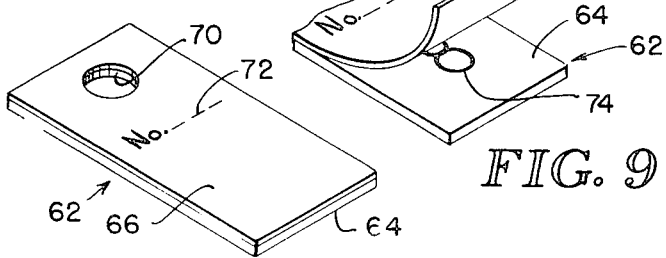

3,636,771

MULTIFREQUENCY SAMPLING SYSTEM AND METHOD

BACKGROUND OF INVENTION

This invention relates generally to the art of multifrequency sampling, and more particularly to a controlled random sampling or testing system which can be used when 100 percent testing or sampling is not needed or desired.

One example of the need which has arisen for statistically accurate random sampling has occurred in the logging industry. In logging operations it is necessary that there be a reasonably accurate determination of the amount of board feet of timber in a truck or railway carload of logs. In the past when labor was cheaper every car or truck load of logs was scaled so that the amount of board feet in the load could be accurately calculated. In time, of course, it was found that scaling every load of logs coming to the mill pond or dump was expensive and time consuming. Accordingly, the industry has begun to shift to spot scaling although a sizeable segment of the industry still scales every load. Sometimes scaling is one load in two or three, and other times it may go as high as one in 25 or one in 50 loads. Many of the large sellers of logs weigh every load, but this does not give in many instances an accurate net board feet accounting because of defect, bark, timber size, moisture content, and other factors such as species of wood involved. Those companies which have gone to sample scaling are those which also weigh every load. A weight determination converted or correlated to board foot measure is necessary to make sampling acceptable to all parties concerned, such as truck drivers, fallers, buckers and loading crews who are usually paid on the amount of forest products rather than on an hourly basis. Because 100 percent scaling places great pressure on the scaler when he is rushed he will occasionally, if not all too frequently, "shotgun" scale a load making the scale figures inaccurate. In scaling the logs must be removed from the conveyance and measured by the scaler. Thus, yard space is required and trucks lose time in waiting for loads to be scaled. One sampling system which has been tried and which is used to some extent, involves a single frequency-type card. This is an awkward system in that the seller must attempt to estimate how many cards of a particular frequency must be ordered and this involves guess work. Accordingly, a heavy inventory of cards of different frequencies will have to be printed up in anticipation of orders for logs. A large number of cards may thus be held in inventory for a long period of time before they are needed.

SUMMARY OF INVENTION

The invention is directed essentially to a system and method for controlled random sampling which involves sampling numbers which are arranged on an underlay card and then covered by an overlay. The sampling array involves preselected numbers in which various numbers occur a predetermined number of times. For convenience, the sampling numbers are arranged in rows spaced apart from each other. Over the sampling numbers on the underlay card will be an overlayment or face card which has an equal number of tabs each of which may be removed or folded back to reveal a single sampling number thereunder. The tabs are arranged on the overlay card to match with the position of the numbers on the underlay card. Also, on the face of the overlay card will be a frequency table which indicates which sampling numbers designate a sample unit. The frequency table is correlated to the sampling array of numbers on the underlay. The underlay numbers can be rearranged so that a whole series of underlay cards may be devised for use in conjunction with a single overlay. While the system illustrated involves 50 numbers in the sampling array and the frequency table is correlated to such 50 digit array, the principle involved will apply to greater or lesser sampling arrays depending upon the particular materials, loads, products, articles or units being sampled or inspected.

Accordingly, it is among the many features of this system and method to eliminate the inventories connected with older single-frequency sampling systems, and to employ a sampling system with greater flexibility. Another feature is that the system and method employ statistically accurate controls and yet eliminate the cost of scaling every load. The system reduces yard space usage, conveyance delays, scaling costs, and increases productivity of persons and equipment involved. Furthermore, there is a saving in bookkeeping because there are less scaling tickets to handle and audit. The system takes pressure off the sampler, scaler or inspector and thus contributes to the taking of more accurate samples. The system allows the user within limits of the frequencies listed on the table to select the frequency he desires on a single card. The sampling frequency can be changed without changing cards. The frequency table and sampling numbers of this system can be varied to handle a specific application and confined to as many or as few frequencies as the user wishes. The sampling numbers are randomly distributed and can be varied from card to card or from series of cards so that the user does not become acquainted with the sampling arrangement. This eliminates any chance that the user can predict or preselect a unit or load to be sampled. Card numbers and coding connected with the card numbers provide means for identifying the particular sampling number arrangement on the underlay card. A similar system can be used on a spindle and used as a pull tag system and still be no different from the card type. The numbers used in the frequency table could easily be substituted by letters, symbols, colors or combinations of these for representing a specific frequency.

BRIEF DESCRIPTION OF DRAWINGS

FIG. 2 is a partial view in perspective showing a perforated tab on the overlay card in place;

FIG. 3 is a partial perspective view showing the perforated tab removed so that a sampling number is uncovered;

FIG. 4 is a partial perspective view showing a modified form of hiding the sampling number on the underside of the tab;

FIG. 5 shows an alternative but equivalent form of the card in a spindle system;

FIG. 6 shows one style of pull tag for the spindle of FIG. 5;

FIG. 7 shows that the pull tag tab may be removed to reveal the sampling number;

FIG. 8 shows an alternative form of tag for the spindle and

FIG. 9 shows the overlay of the pull tag of FIG. 8 lifted so that a sampling number is uncovered.

DESCRIPTION OF PREFERRED EMBODIMENTS

Figure 1:
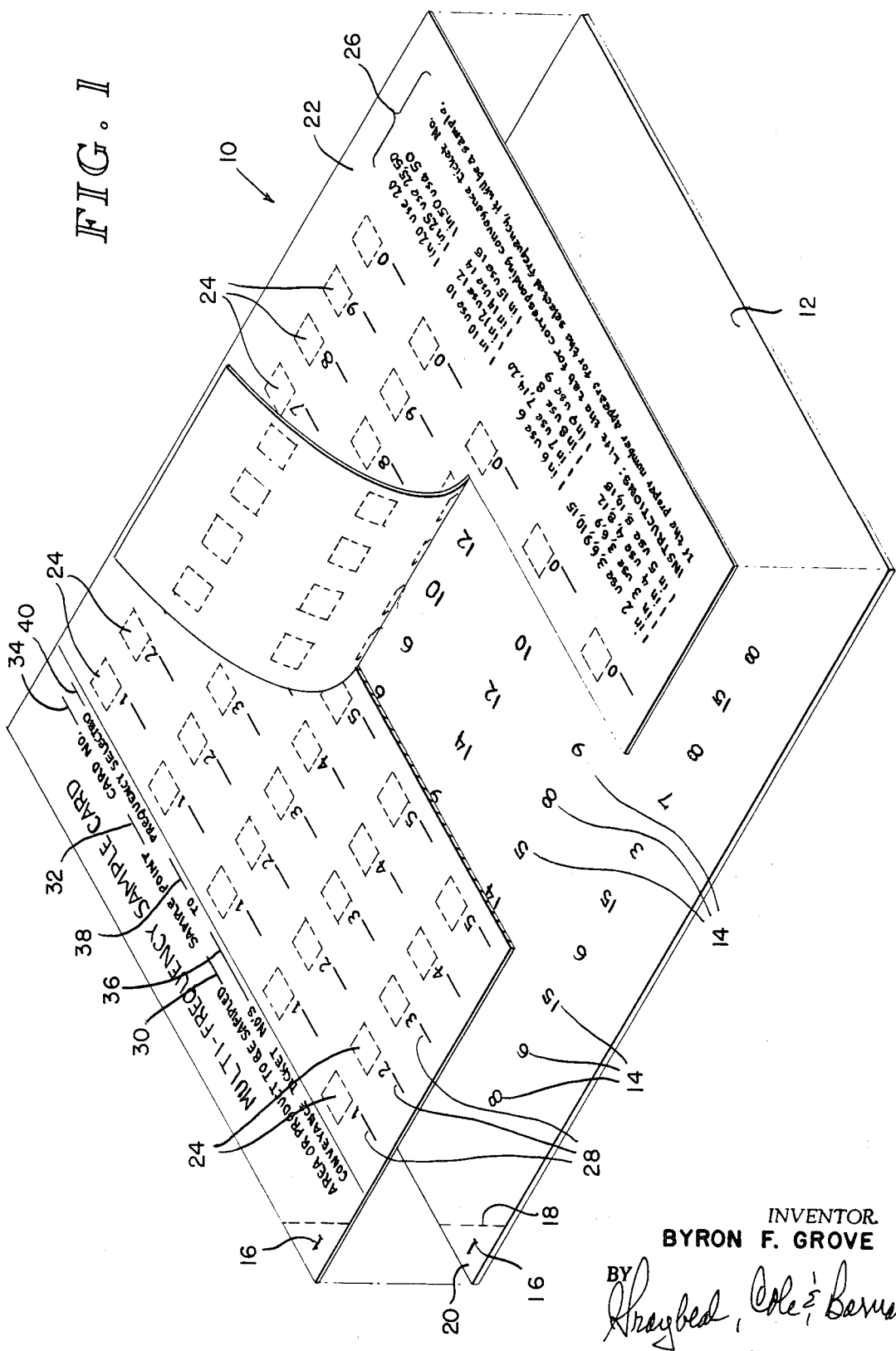
FIG. 1 is a view in perspective illustrating the general physical arrangement of the multifrequency card of this invention, with the underlay and overlay cards separated to show the sampling numbers on the underlay card and the corresponding arrangement of tabs as well as the frequency table and other information on the overlay card.

FIG. 1 shows a preferred embodiment of the invention. A multifrequency sample card generally designated by the number 10 comprises an underlayment section 12 which will preferably be made of cardboard or heavy paper, although the precise physical properties of the underlay card are not critical to the invention. It is important that numbers not show through the paper. The underlay portion if provided with a series of randomly organized sampling numbers 14. For purposes of illustration the particular card 10 shown has 50 numbers arranged in five vertical-horizontal rows of 10 numbers each. The sampling numbers 14 are statistically predetermined, as for instance the number of occurrences of each digit or combination of digits, but are organized in a random display. The sampling numbers may be arranged as desired from one card to the other. It is contemplated that each card 10 in a series will have a separate array of sampling numbers on the underlay card 12. For example, there may be 12 cards to a series for a total of 600 tabs at 50 tabs per card. Accordingly, a code number 16 may be printed on a corner code designator 20 of the underlay card with perforations 18 enabling the code designator to be easily removed when the card is issued. The code number 16 will be used for accounting purposes to identify the card number and/or specific sampling number array on the underlay portion. The code is desirable not only for accounting information but also as an index for the sampling number array. Different arrays may be made but will have to be correlated with the frequency table.

An overlay card or sheet 22 is mounted on the underlay card 12 to cover the sampling numbers 14. The overlay 22 will be provided with a series of perforated tabs 24 with one tab being provided for each sampling number on the underlay card. Thus as seen in FIGS. 2 and 3, when one of the perforated tabs 24 is removed from the overlay, a corresponding number on the underlay will be uncovered. In addition to a corresponding tab for each sampling number on the underlay, the overlay card will have a frequency table 26 which is correlated to the array of sampling numbers 14. The frequency table 26 and the arrangement of sampling numbers 14 in the particular embodiment illustrated utilize 50 numbers. Thus it will be seen from the frequency table 26 that if one in every two units or loads is to be sampled, then the frequency table will indicate which numbers designate a load or unit to be sampled. In the particular example shown, for a one in every two sampling, the numbers 3, 6, 9, 10 and 15 when uncovered will designate a load or unit to be sampled. Likewise, to sample one in every five loads, the numbers 5, 10 and 15 when uncovered will designate a load to be sampled. In addition, the overlay card will be provided with a space 28 beside each tab to identify a conveyance, load or other unit designation number. In many applications the load or unit space 28 will be prenumbered so that as a unit arrives at the sampling station its corresponding tab may be lifted.

In addition, other information may be provided at the top of the card. Such added information may be an area or product designation space 30, sample point or location designation space 32, a card number space 34, and spaces 36 and 38 to designate the conveyance or load ticket series from a given number to a given number inclusive. Finally, the card has a space 40 for designating the frequency selected. The code number 16 which appears on the underlay card 12 will also appear on one corner of the overlay and is also identified as number 16. The information thus contained on this multifrequency sampling card is sufficient for accurate accounting and statistical control purposes. Not all of the information provided for may be desired in a particular sampling situation, but it is contemplated that at the very minimum the sampling numbers on the underlay card, the overlay and pull tabs, and the frequency table and frequency selection will be needed.

FIG. 4 shows an alternative embodiment in which a tab 42 is not removable but folds back with the sampling number 14 on the underside of the overlay rather than on the underlay.

FIGS. 5 through 9 show an alternative embodiment of this multifrequency sampling system in a slightly different physical arrangement. A spindle 50 is mounted on base 52 and has a spindle mounting 54 on which is printed the frequency table 56 as well as other card information 58 and the code number designation 60. Mounted on the spindle 50 are a series of individual pull tags generally designated by the number 62. Each tag will have an underlay portion 64 and an overlay portion 66. Each pull tag 62 will have a perforated number tab 68, a hole 70 in one end of the pull tab so that the pull tab can be received on spindle 50, and if desired a conveyance number space 72. On the underlay as shown in FIGS. 7 and 9 will be a sampling number 74, although it will be appreciated that the sampling number may also appear on the underside of the overlay 66 as shown in FIG. 4. The FIG. 5 embodiment gives the sampling exposure but does not provide accounting records as cards will. If the pull tags 62 carry a unit number then they should be pulled in sequence. Without unit or load designation in space 72 random pulling is acceptable, although specific identity of a load or unit number is thus forfeited.

For logging applications and, as an example only, the frequency selected is determined by numerous variables such as volume of board feet in the sale, width of the logging trucks, weight of the truck loads, stumpage price of the different species, and average size of the logs by species in the timber stand. Statistical formulas normally will dictate the frequency rate used. Initial determination might specify a 1 in 5 frequency, but subsequent information might indicate a need to change to 1 in 4 or 1 in 6. Such a change can be made at any time without changing cards, such as after the third or 600th unit. The ability to change frequencies is desirable since some companies may key frequencies to such items as available time and scaling manpower. It should also be mentioned that simultaneous use of more than one frequency is possible. For instance, there may be a scaling of one in four loads but on the same card there could be a check of truck maintenance records by inspection of one in every 10 trucks.

It will be appreciated that the multifrequency system permits, as stated above, the selection and use of more than one frequency at one time. Furthermore, frequency or frequencies can be changed without changing cards as in old systems and without impairing accuracy. Finally, the multifrequency table can be modified to include more frequencies, to exclude some frequencies or change the frequencies.

What is claimed is:

1. A multifrequency controlled random sampling system, comprising:
   a. underlayment means having a preselected array of randomly organized sampling numbers thereon, from which array a selected portion of said numbers will designate samples;
   b. overlay means on said underlayment means and which together with said underlayment means conceals said sampling numbers, said overlay means including tab means overlying each sampling number which can be raised to expose its related sampling number; and
   c. a multifrequency sampling table for said array of sampling numbers which indicates for each of a plurality of sampling frequencies which of said exposed sampling numbers are to be used to designate a sample.

2. The multifrequency sampling system of claim 1 and wherein a unit numbering space is located proximately to each tab.

3. The multifrequency sampling system according to claim 2 and wherein a removable code designation is provided on each of said underlayment means and overlay means to identify at least one of the sampling number array and the card number.

4. The multifrequency sampling system of claim 3 and wherein said overlay means is provided with space at least to identify the frequency selected.

5. The multifrequency sampling system of claim 1 and wherein said underlayment means comprises a plurality of individual pull tags mounted on a spindle and corresponding in number to the sampling number array with each pull tag having a sampling number thereon.

6. Multifrequency sampling system, comprising:
   a. an underlayment card having a preselected array of randomly organized sampling numbers arranged thereon in horizontal and vertical rows, from which array a selected portion of said numbers will designate samples;
   b. an overlay face card covering said underlayment card and which together with said underlayment means conceals said sampling numbers, said overlay face card including tab means overlying each sampling number which can be raised to expose its related sampling number; and
   c. multifrequency sampling table on said overlay face card for said array of sampling numbers which indicates for each of a plurality of sampling frequencies which of said exposed sampling numbers are to be used to designate a sample.

7. The multifrequency sampling system of claim 6 and wherein a unit numbering space is located proximately to each tab.

8. The multifrequency sampling system according to claim 7 and wherein a removable code designation is provided on each of said underlayment card and overlay face card to identify at least one of the sampling number array and the card number.

9. The multifrequency sampling system of claim 8 and wherein said overlay card is provided with space at least to identify frequency selected.

10. In a multifrequency unit sampling method including a preselected array of randomly organized sampling numbers on underlay means and concealed by overlay means and having tab means on the overlay means. overlying each sampling number, and also including a multifrequency sampling table correlated to said array of sampling numbers, the steps of:
 a. selecting a sampling frequency at which units are to be sampled so that sampling numbers are specified which will designate a unit to be sampled,
 b. lifting a tab means to reveal a sampling number for each unit,
 c. determining from said sampling table whether a sampling number so revealed designates a unit to be sampled, and
 d. sampling said unit if the selected frequency and sampling number so designate.

11. The method according to claim 10 and wherein said sampling numbers are randomly revealed.

12. The method according to claim 10 and wherein the said sampling numbers are sequentially revealed.

13. The method according to claim 10 and wherein the units are numbered and each unit number is entered beside a tab so that a particular unit has a corresponding tab.

* * * * *